(12) United States Patent
Kao

(10) Patent No.: US 10,040,189 B2
(45) Date of Patent: *Aug. 7, 2018

(54) MAGNETIC HAND TOOL FRAME

(71) Applicant: Jui-Chien Kao, Taichung (TW)

(72) Inventor: Jui-Chien Kao, Taichung (TW)

(*) Notice: Subject to any disclaimer, the term of this patent is extended or adjusted under 35 U.S.C. 154(b) by 366 days.

This patent is subject to a terminal disclaimer.

(21) Appl. No.: 14/988,925

(22) Filed: Jan. 6, 2016

(65) Prior Publication Data

US 2017/0190047 A1    Jul. 6, 2017

(51) Int. Cl.
| | |
|---|---|
| B25H 3/04 | (2006.01) |
| F16B 2/24 | (2006.01) |
| A47F 5/08 | (2006.01) |
| A47B 96/14 | (2006.01) |
| F16B 1/00 | (2006.01) |
| A47F 7/00 | (2006.01) |

(52) U.S. Cl.
CPC ............. *B25H 3/04* (2013.01); *A47F 5/0846* (2013.01); *A47F 7/0028* (2013.01); *F16B 1/00* (2013.01); *F16B 2001/0035* (2013.01)

(58) Field of Classification Search
CPC ....... A47F 5/0846; A47F 7/0028; B25H 3/04; B25H 3/06; F16B 1/00; F16B 2001/0035
USPC ...................................................... 211/70.6
See application file for complete search history.

(56) References Cited

U.S. PATENT DOCUMENTS

| | | | | |
|---|---|---|---|---|
| 6,571,966 B1* | 6/2003 | Hsiao | ............ | A47F 7/0028 206/379 |
| 7,861,871 B2* | 1/2011 | Kao | ............ | B25H 3/04 206/349 |
| 7,882,965 B1* | 2/2011 | Kao | ............ | B25H 3/04 211/106.01 |
| 8,069,995 B2* | 12/2011 | Winnard | ............ | B25H 3/003 211/70.6 |
| 8,403,155 B1* | 3/2013 | Kao | ............ | B25H 3/04 206/376 |
| 8,813,957 B1* | 8/2014 | Kao | ............ | B25H 3/003 206/378 |
| 9,126,329 B2* | 9/2015 | Kao | ............ | B25H 3/04 |
| 9,452,524 B1* | 9/2016 | Kao | ............ | B25H 3/04 |
| 9,522,467 B1* | 12/2016 | Kao | ............ | A47F 7/0028 |
| 9,597,792 B1* | 3/2017 | Kao | ............ | A47F 7/0028 |
| 9,656,385 B1* | 5/2017 | Kao | ............ | B25H 3/04 |
| 9,827,663 B2* | 11/2017 | Kao | ............ | B25H 3/04 |

(Continued)

*Primary Examiner* — Joshua E Rodden
(74) *Attorney, Agent, or Firm* — Harness, Dickey & Pierce, P.L.C.; Anthony G. Fussner

(57) ABSTRACT

A magnetic hand tool frame includes a baseboard, at least one clamping element, and two attraction modules. The baseboard has a body and at least one clamping rack formed on the body. The at least one clamping element is connected to the at least one clamping rack. The attraction modules are connected to the baseboard respectively at two opposite sides of the body, and each has a holding mount and a magnetic base. The holding mount is connected to the body at one of the opposite sides of the body, is opposite to the at least one clamping element and has a connecting rack formed on the holding mount. The magnetic base is connected to the holding mount in the connecting rack and has a mounting frame and at least one magnetic block securely mounted in the mounting frame to provide a magnetic attraction effect to the magnetic base.

14 Claims, 16 Drawing Sheets

(56) References Cited

U.S. PATENT DOCUMENTS

| | | | |
|---|---|---|---|
| 2008/0047911 A1* | 2/2008 | Kao | A47F 5/0838 211/70.6 |
| 2008/0156754 A1* | 7/2008 | Cheng | B25H 3/04 211/70.6 |
| 2008/0251476 A1* | 10/2008 | Shiao | B25H 3/04 211/70.6 |
| 2009/0218302 A1* | 9/2009 | Winnard | B25H 3/003 211/70.6 |
| 2011/0174752 A1* | 7/2011 | Liao | A47F 5/0838 211/70.6 |
| 2015/0034572 A1* | 2/2015 | Kao | B25H 3/04 211/13.1 |
| 2015/0202767 A1* | 7/2015 | Kao | B25H 3/04 211/70.6 |
| 2016/0221178 A1* | 8/2016 | Hsieh | B25H 3/04 |
| 2017/0188722 A1* | 7/2017 | Winnard | A47F 5/0823 |
| 2017/0190047 A1* | 7/2017 | Kao | B25H 3/04 |

* cited by examiner

US 10,040,189 B2

MAGNETIC HAND TOOL FRAME

FIELD

The present invention relates to a magnetic hand tool frame, and more particularly to a magnetic hand tool frame that may be mounted on an object by magnetic forces, may be stored conveniently and may have an improved structural strength.

BACKGROUND

This section provides background information related to the present disclosure which is not necessarily prior art.

A conventional hand tool frame is used to hold or store hand tools such as wrenches or socket bits and has a baseboard, multiple clamping elements, and a handle. The baseboard is made by aluminum extrusion and has a periphery, a surface, and multiple racks. The racks are formed in the surface of the baseboard at spaced intervals. The handle is mounted on the periphery of the baseboard. The clamping elements are slidably mounted in the racks of the baseboard. The user can store and display the wrenches or socket bits on the racks by mounting the wrenches on the clamping elements or mounting the socket bits around the clamping elements.

Though the conventional hand tool frame can position the wrenches or socket bits for storage purposes, the handle is exposed out of the baseboard such that the whole volume of the conventional hand tool frame is increased. The user needs a large space to store the conventional hand tool frame and this is inconvenient both in storage and use. Furthermore, since the baseboard is made by aluminum extrusion, when the conventional hand tool frame is used to store a lot of socket bits or heavy tools, the structural strength of the conventional hand tool frame cannot bear the weight of the socket bits or the tools and may be distorted.

To overcome the shortcomings, the present invention provides a magnetic hand tool frame to mitigate the aforementioned problems.

SUMMARY

This section provides a general summary of the disclosure, and is not a comprehensive disclosure of its full scope or all of its features.

An aspect of the present invention is to provide a magnetic hand tool frame that may be mounted on an object by magnetic forces, may be stored conveniently, and may have an improved structural strength.

The magnetic hand tool frame includes a baseboard, at least one clamping element, and two attraction modules. The baseboard has a body and at least one clamping rack formed on the body. The at least one clamping element is connected to the at least one clamping rack. The attraction modules are connected to the baseboard respectively at two opposite sides of the body, and each has a holding mount and a magnetic base. The holding mount is connected to the body at one of the opposite sides of the body, is opposite to the at least one clamping element and has a connecting rack formed on the holding mount. The magnetic base is connected to the holding mount in the connecting rack and has a mounting frame and at least one magnetic block securely mounted in the mounting frame to provide a magnetic attraction effect to the magnetic base.

Other aspects, advantages, and novel features of the present invention will become more apparent from the following detailed description when taken in conjunction with the accompanying drawings.

DRAWINGS

The drawings described herein are for illustrative purposes only of a selected embodiment and not all possible implementations, and are not intended to limit the scope of the present disclosure.

DETAILED DESCRIPTION

Example embodiments will now be described more fully with reference to the accompanying drawings.

With reference to FIGS. 1 to 4, a first embodiment of a magnetic hand tool frame in accordance with the present invention has a baseboard 10, at least one clamping element 20, and two attraction modules 30.

Figure 1:
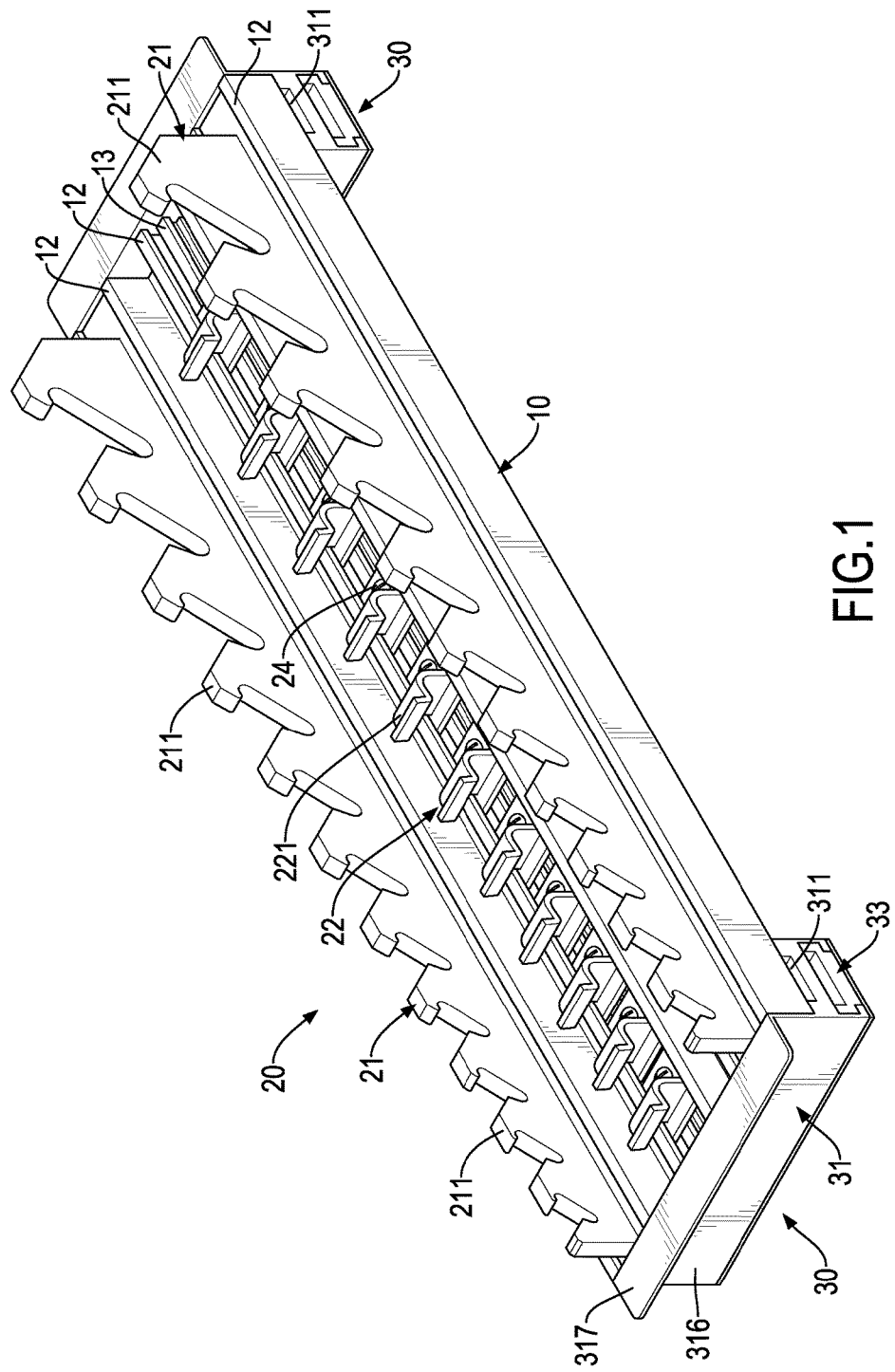
FIG. 1 is a perspective view of a first embodiment of a magnetic hand tool frame in accordance with the present invention.
Figure 2:
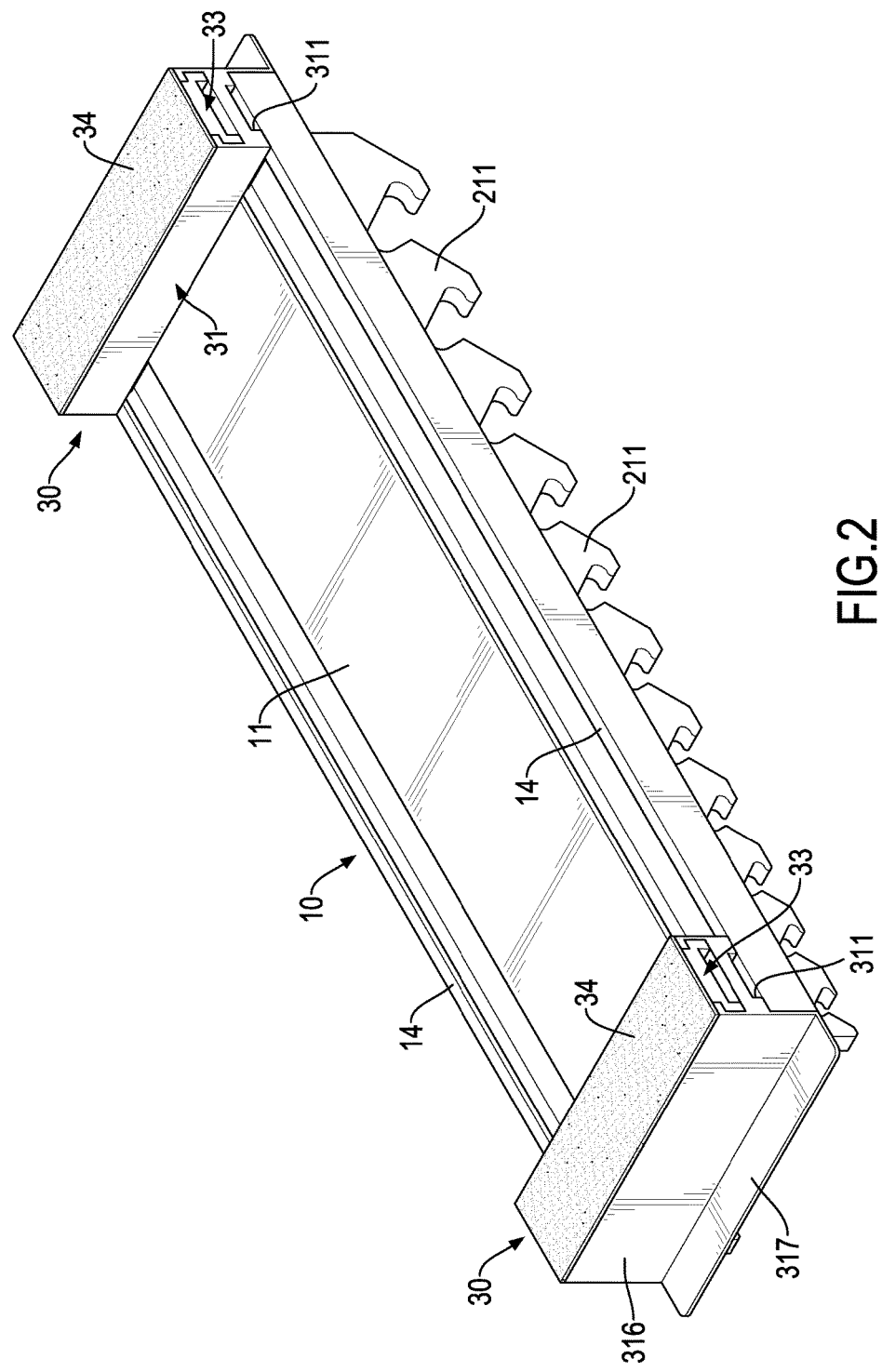
FIG. 2 is another perspective view of the magnetic hand tool frame in FIG. 1.
Figure 5:
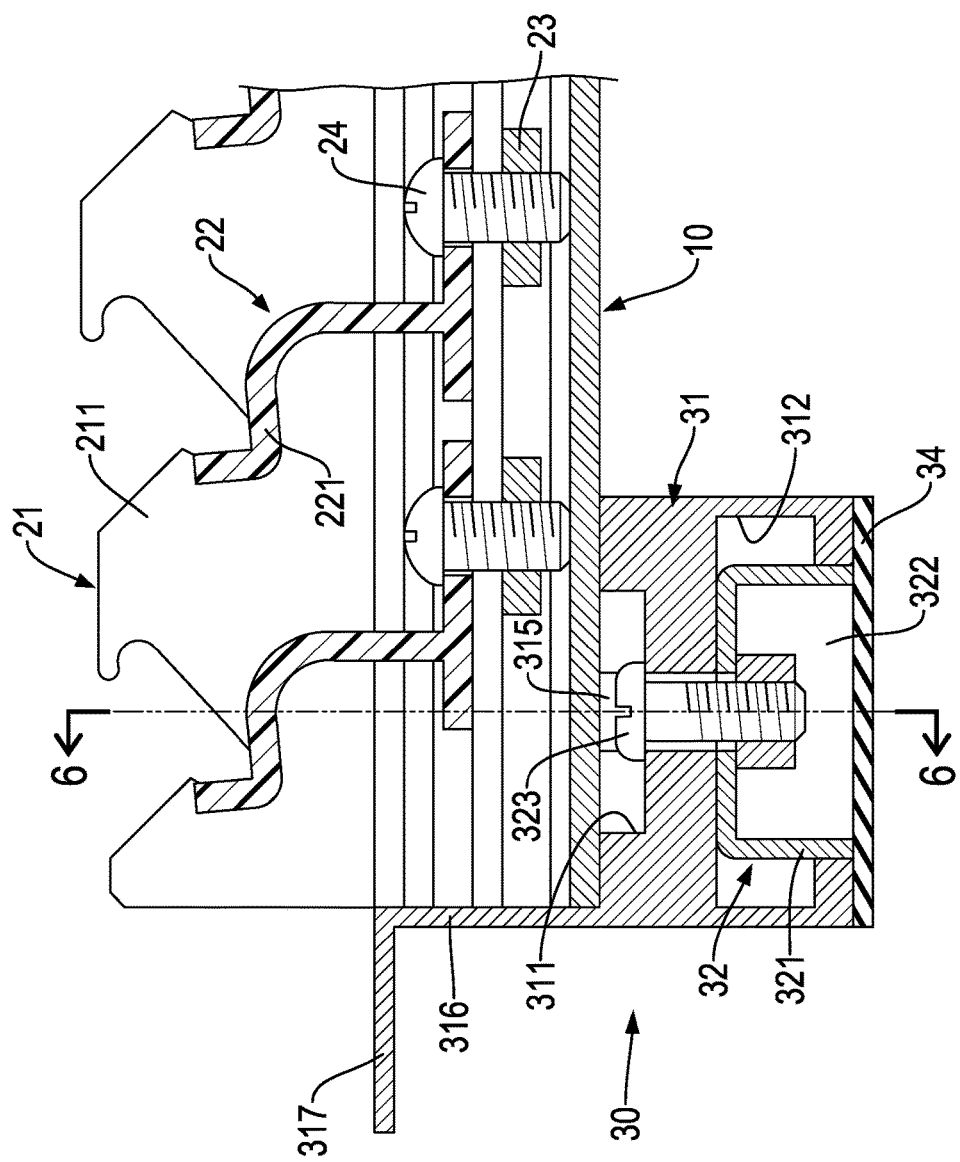
FIG. 5 is an enlarged cross sectional view in partial section of the magnetic hand tool frame across line 5-5 in FIG. 6.
Figure 6:
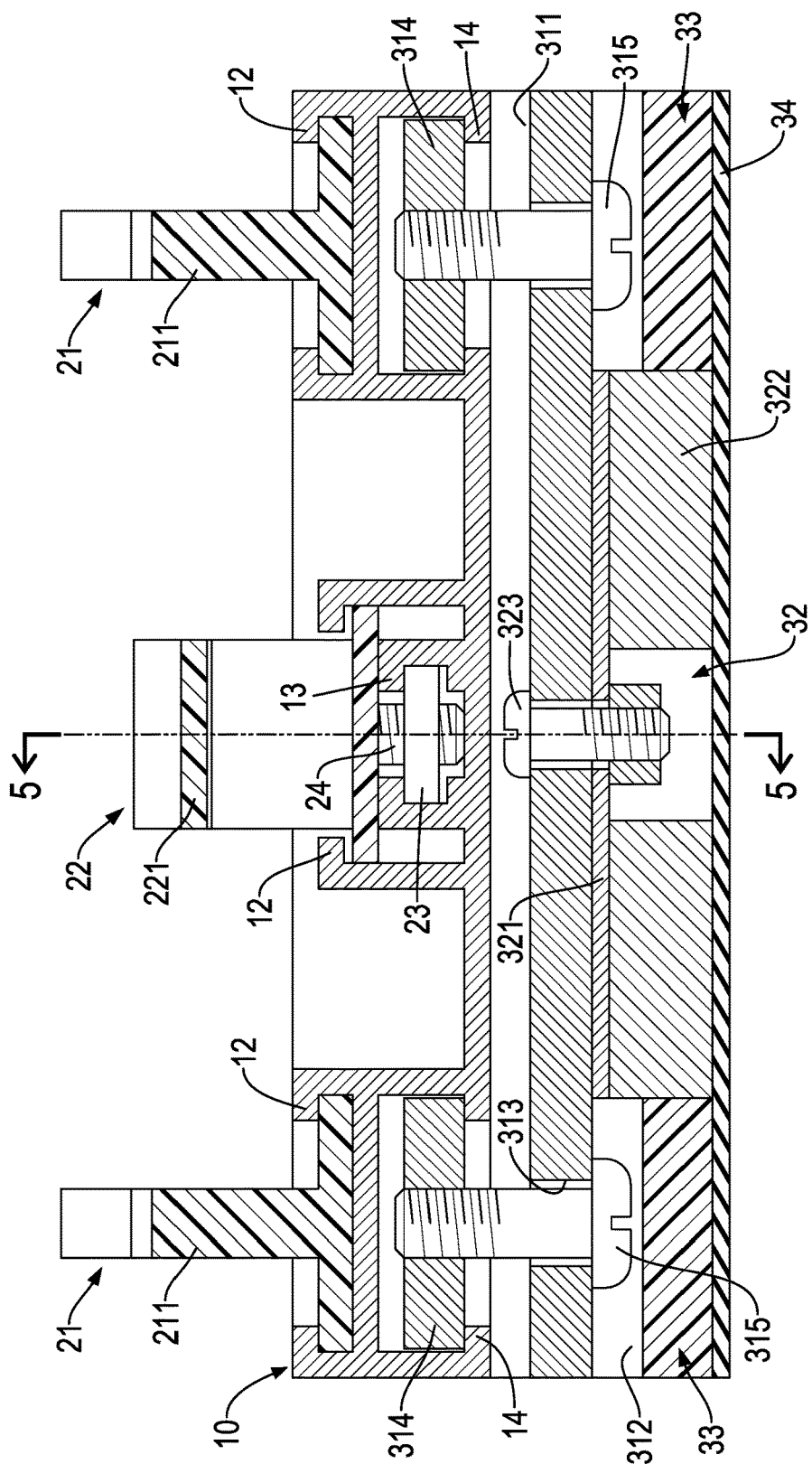
FIG. 6 is an enlarged cross sectional view in partial section of the magnetic hand tool frame across line 6-6 in FIG. 5.

With reference to FIGS. 1, 5, and 6, the baseboard 10 may be made by aluminum extrusion, is elongated and has a body 11 and at least one clamping rack 12. The body 11 may be rectangular in shape and has a top surface, a bottom surface, and two opposite sides. The at least one clamping rack 12 may be hollow and is formed on and protrudes from the top surface of the body 11. In addition, the baseboard 10 may have three clamping racks 12 formed on and protruding from the top surface of the body 11 at spaced intervals. Furthermore, the baseboard 10 has an upper track 13 formed on and protruding from the top surface of the body 11 in a middle one of the three clamping racks 12. The baseboard 10 further has two lower tracks 14 formed on and protruding from the bottom surface of the body and respectively aligning with two of the clamping racks 12 beside the upper track 13.

The at least one clamping element 20 is mounted on the baseboard 10, is clamped in the at least one clamping rack 12 on the top surface of the body 11, and has two clamping panels 21 and multiple positioning boards 22. Each one of the clamping panels 21 has a bottom, a top, and multiple clamping claws 211. The bottoms of the clamping panels 21 are respectively connected to two of the clamping racks 12 beside the upper track 13. The tops of the clamping panels 21 respectively extend out of the two corresponding clamping racks 12. The clamping claws 211 are formed on and protrude from the top of each one of the clamping panels 21 at spaced intervals, and have same or different sizes.

The positioning boards 22 are mounted in the middle clamping rack 12 at spaced intervals over the upper track 13 and between the clamping panels 21, and each one of the positioning boards 22 has a bottom, a top, and an elastic arm 221. The bottoms of the positioning boards 22 are mounted in the middle clamping rack 12. The tops of the positioning boards 22 extend out of the middle clamping rack 12. The elastic arm 221 is formed on and protrudes from the top of the positioning board 22 and extends out of the middle clamping rack 12. In addition, each one of the positioning boards 22 has a connecting board 23 and a connecting element 24. The connecting board 23 is mounted in the upper track 13 below the bottom of the positioning board 22. The connecting element 24 is mounted through the bottom of the positioning board 22 via the middle clamping rack 12 and is securely mounted in the connecting board 23 via the upper track 13 to connect the positioning board 22 securely with the connecting board 23 between the middle clamping rack 12 and the upper track 13.

With reference to FIGS. 3 to 6, the attraction modules 30 are connected to the baseboard 10 respectively at the opposite sides of the body 11 to hold the at least one clamping element 20 securely on the baseboard 10. Each one of the attraction modules 30 has a holding mount 31 and a magnetic base 32.

The holding mount 31 is connected to the lower tracks 14 at one of the opposite sides of the body 11, abuts the bottom surface of the body 11 and has a top side, a bottom side, an outer side, a recess 311, a connecting rack 312, two through holes 313, two fixing boards 314, two fixing elements 315, a side panel 316, and a holding panel 317. The top side of the holding mount 31 abuts the bottom surface of the body 11 and faces the lower tracks 14 at one of the opposite sides of the body 11. The bottom side of the holding mount 31 is opposite to the top side of the holding mount 31. The outer side of the holding mount 31 is formed on the holding mount 31 away from the lower tracks 14. The recess 311 is formed in the top side of the holding mount 31 and communicates with the lower tracks 14. The connecting rack 312 is formed on and protrudes from the bottom side of the holding mount 31 and has two open ends.

The through holes 313 are formed in the connecting rack 312, are formed through the bottom side and the top side of the holding mount 31, and respectively communicate with the lower tracks 14. The fixing boards 314 are respectively mounted in the lower tracks 14 and respectively align with the through holes 313. The fixing elements 315 are respectively mounted through the through holes 313 via the connecting rack 312, and are respectively connected to the fixing boards 314 via the lower tracks 14 to connect the holding mount 31 securely with the baseboard 10 at one of the opposite sides of the body 11.

The side panel 316 is formed on and protrudes upwardly from the outer side of the holding mount 31 to close the clamping racks 12, the upper track 13, and the lower tracks 14 of the baseboard 10 at one of the opposite sides of the body 11, and this may prevent the clamping panels 21, the positioning boards 22, and the connecting boards 23 separating from the baseboard 10 via the corresponding opposite side of the body 11. In addition, the side panel 316 has an outer side opposite to the body 11, and the holding panel 317 is formed on and protrudes transversally from the outer side of the side panel 316. Then, a user can carry the magnetic hand tool frame conveniently by lifting the holding panels 317 of the holding mounts 31 by hands.

Figure 3:
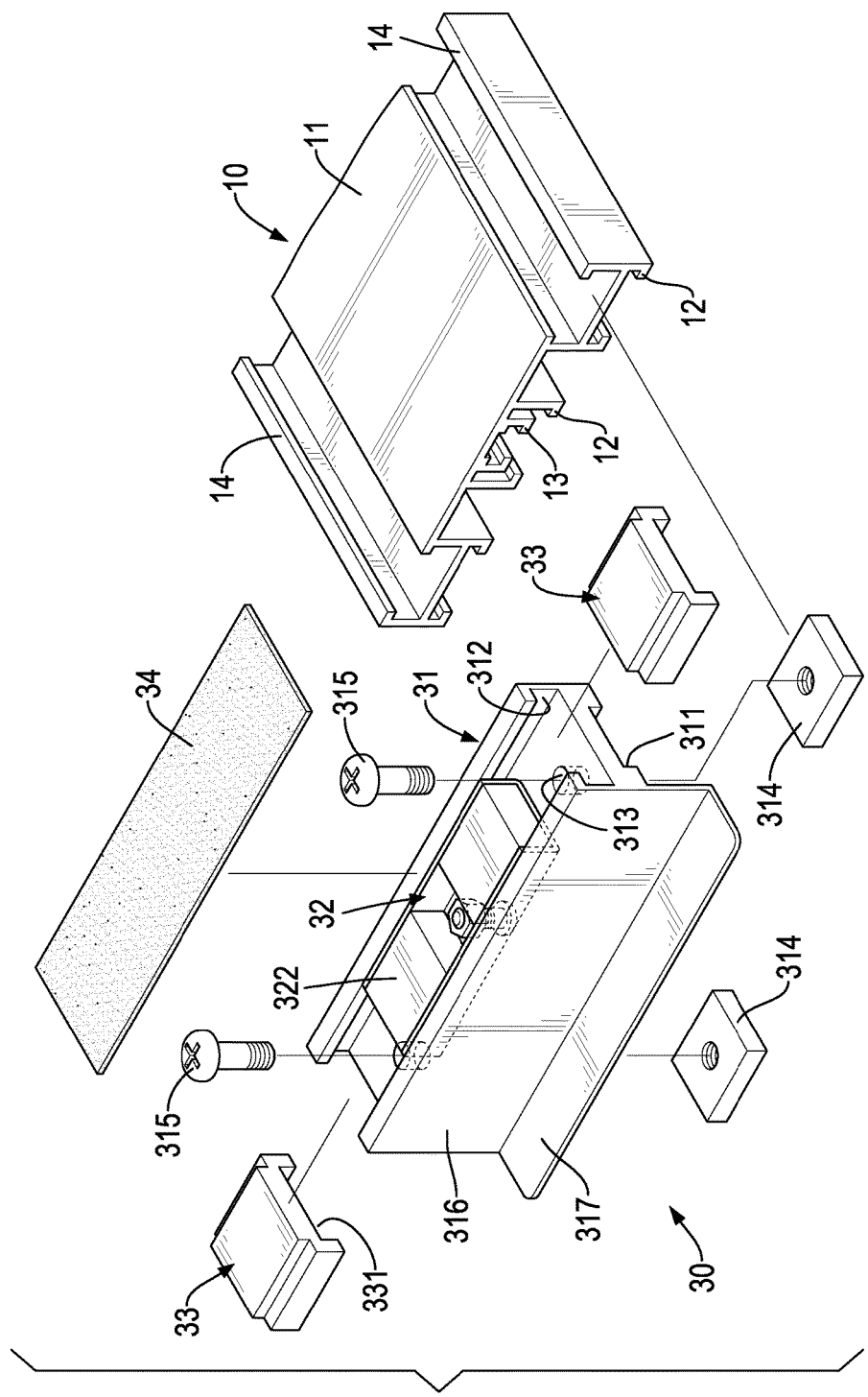
FIG. 3 is an enlarged and exploded perspective view of the magnetic hand tool frame in FIG. 1.
Figure 4:
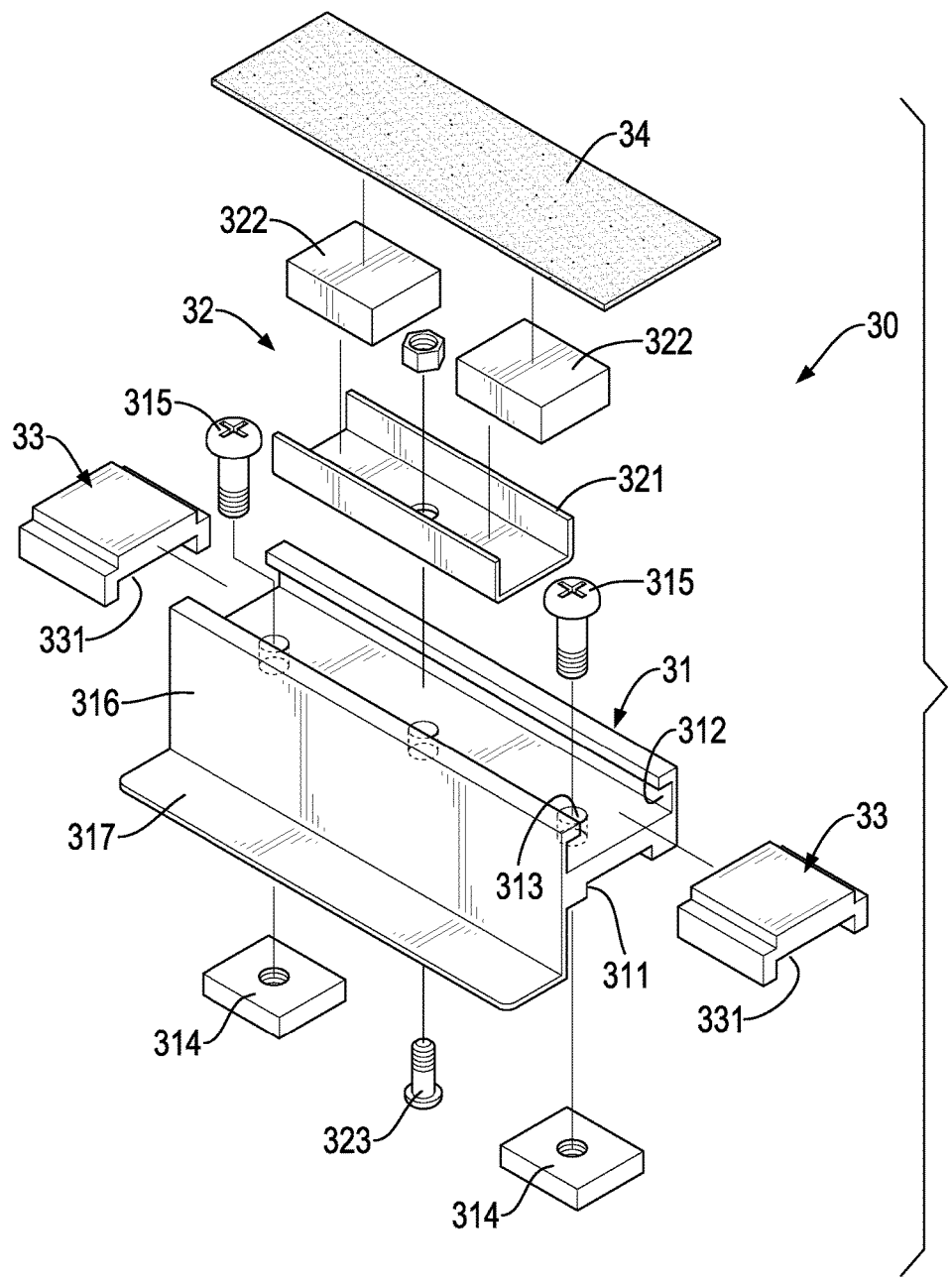
FIG. 4 is a further enlarged and exploded perspective view of the magnetic hand tool frame in FIG. 1.

With reference to FIGS. 3 and 4, the magnetic base 32 is connected to the holding mount 31 in the connecting rack 312, and has a mounting frame 321, at least one magnetic block 322, and at least one fastener 323. The mounting frame 321 may be U-shaped, and is mounted in the connecting rack 312 of the holding mount 31. The at least one magnetic block 322 is securely mounted in the mounting frame 321 below the holding mount 31 to provide a magnetic attraction effect to the magnetic base 32. The at least one fastener 323 is mounted through the holding mount 31 from the recess 311 to the mounting frame 321, and is securely connected to the mounting frame 321 to hold the magnetic base 32 securely with the holding mount 31. Furthermore, the magnetic base 32 may have two magnetic blocks 322 mounted in the mounting frame 321 at a spaced interval.

Additionally, the mounting frame 321 has a length shorter than a length of the connecting rack 312 of the holding mount 31, and the attraction module 30 further has two limiting mounts 33 mounted in the connecting rack 312 respectively via the open ends of the connecting rack 312 and mounted beside the mounting frame 321 to enable the limiting mounts 33 to respectively align with the fixing elements 315. Each one of the limiting mounts 33 has a middle segment, a bottom segment, and a through slot 331. The middle segment of the limiting mount 33 extends out of the connecting rack 312. The bottom segment of the limiting mount 33 is formed with the middle segment of the limiting mount 33 and is mounted in the connecting rack 312. The through slot 331 is transversally formed through the bottom segment of the limiting mount 33, communicates with the connecting rack 312, and is mounted around a corresponding fixing element 315 of the holding mount 31 to prevent the corresponding fixing element 315 interfering with the limiting mount 33. In addition, the attraction module 30 further has a decorative plate 34 securely mounted on the connecting rack 312 of the holding mount 31 to cover the magnetic base 32 and the limiting mounts 33.

With reference to FIG. 1, when the first embodiment of the magnetic hand tool frame is used to store a wrench 50, two ends of the wrench 50 are respectively mounted on two clamping claws 211 of the clamping panels 21. Then, with reference to FIGS. 5 and 6, the connecting element 24 of one of the positioning boards 22 is loosened to form gaps respectively between the positioning board 22 and a corresponding clamping rack 12, and between a corresponding connecting board 23 and the upper track 13. The positioning board 22 and the corresponding connecting board 23 may move respectively relative to the corresponding clamping rack 12 and the upper track 13, and this may enable the elastic arm 221 of the positioning board 22 to press against the wrench 50. Then, the connecting element 24 is fastened to enable the positioning board 22 and the corresponding connecting board 23 to securely clamp with the upper track 13, and this may enable the positioning board 22 to securely mount in the corresponding clamping rack 12. According to the above-mentioned operation, the wrench 50 may be securely held on the body 11 of the baseboard 10 between the clamping claws 211 of the clamping panels 21 and the elastic arm 221 of the positioning board 22.

Figure 7:
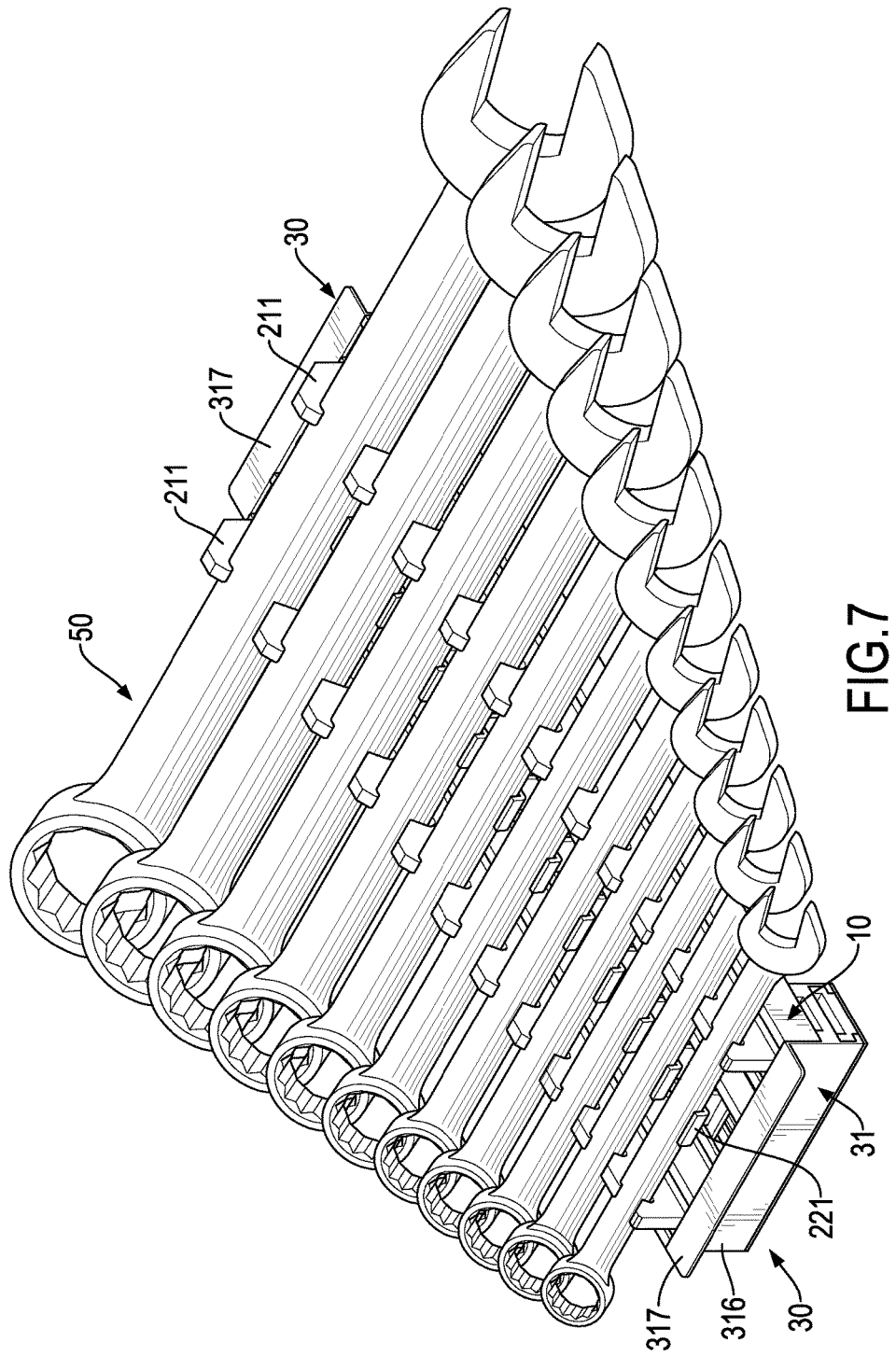
FIG. 7 is an operational perspective view of the magnetic hand tool frame in FIG. 1, holding multiple wrenches.

Furthermore, when multiple wrenches 50 are securely held on the body 11 of the baseboard 10 by the above-mentioned operation as shown in FIG. 7, the user may store and display the wrenches 50 between the baseboard 10 and the clamping element 20 on a tool cabinet or a display stand by the attraction modules 30 magnetically attracting to the tool cabinet or the display stand. Then, the baseboard 10 doesn't need to form a handle on a periphery of the baseboard 10, and this may reduce the whole volume of the magnetic hand tool frame and is convenient both in storage and use.

In addition, the baseboard 10 is made by aluminum extrusion and may have multiple sharp points formed at the opposite sides of the body 11, and the user may get hurt by the sharp points in use. With reference to FIG. 5, the side panels 316 of the holding mounts 31 are used to close the opposite sides of the body 11 to prevent the user from getting hurt by touching the sharp ends of the opposite sides of the body 11, and this may improve the safety in use. In addition, the side panels 316 of the holding mounts 31 may also prevent the clamping panels 21 and the positioning boards 22 that are mounted in the clamping racks 12 from separating from the baseboard 10. Furthermore, the attraction modules 30 that are connected to the opposite sides of the body 11 may improve the structural strength of the magnetic hand tool frame to bear the weight of the socket bits or the tools.

Figure 8:
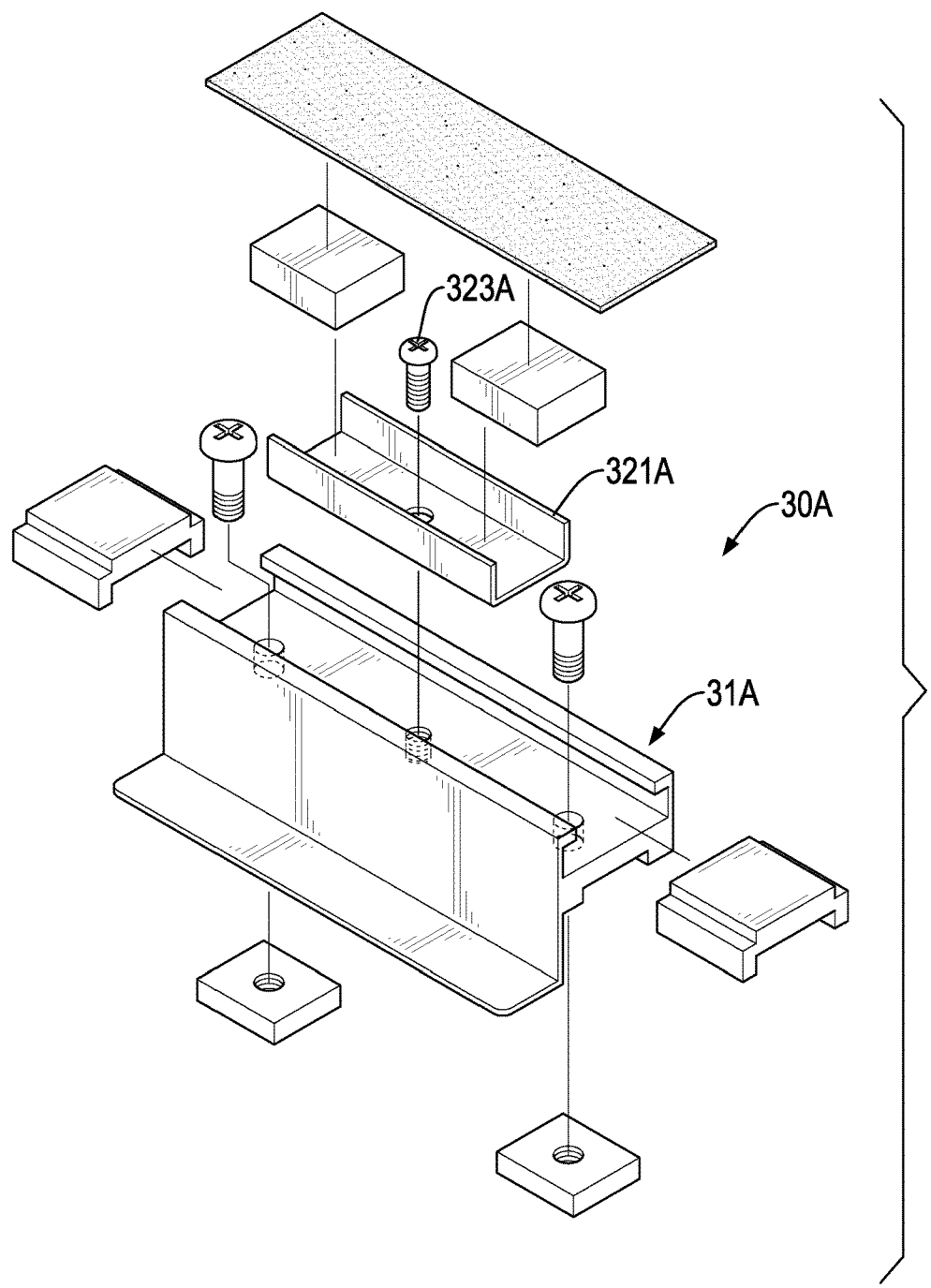
FIG. 8 is an enlarged and exploded perspective view of a second embodiment of a magnetic hand tool frame in accordance with the present invention.
Figure 9:
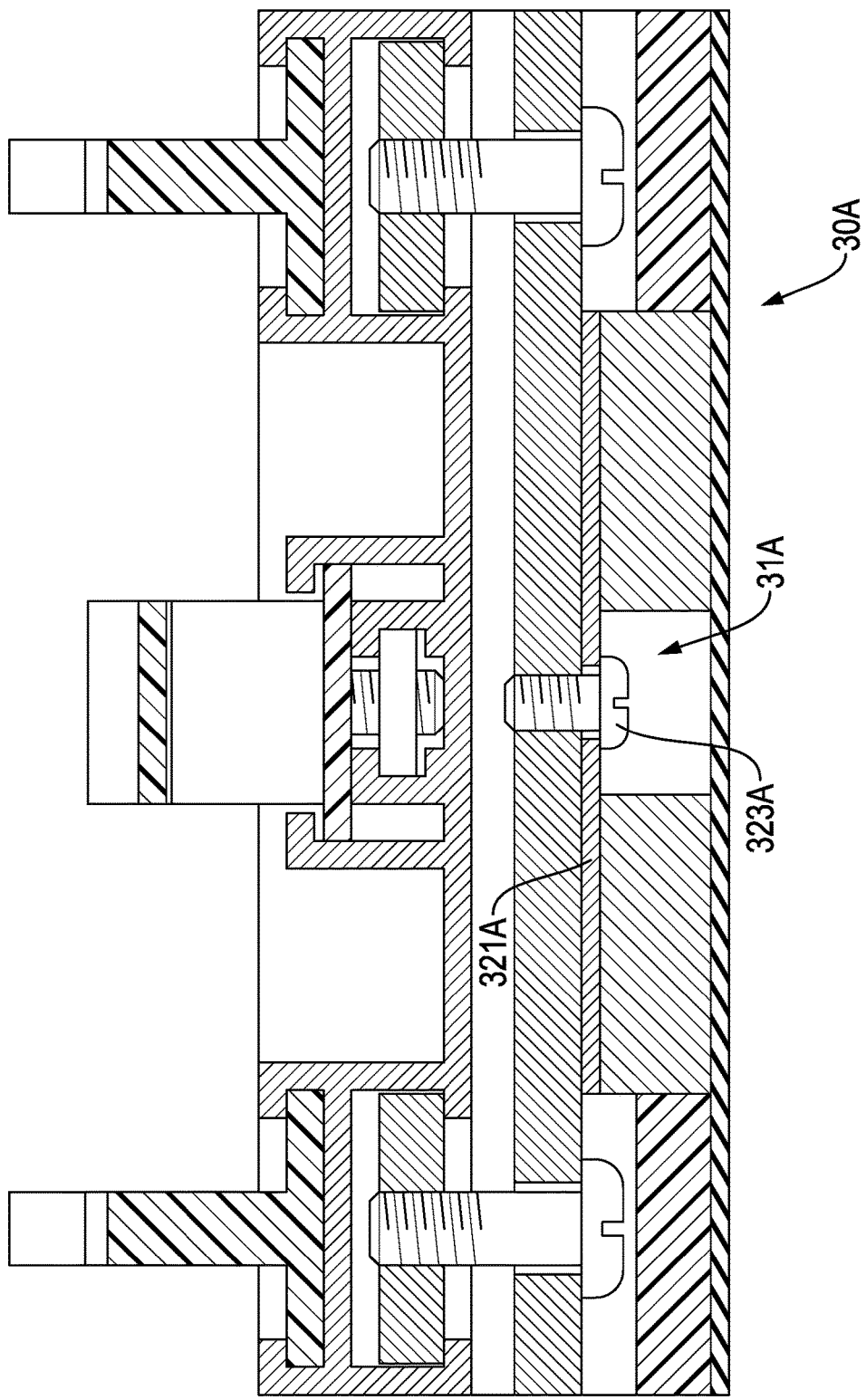
FIG. 9 is an enlarged cross sectional view in partial section of the magnetic hand tool frame in FIG. 8.

With reference to FIGS. 8 and 9, a second embodiment of a magnetic hand tool frame has similar structures substantially same as the structures in the above-mentioned first embodiment of the magnetic hand tool frame except the at least one fastener 323A of each one of the attraction modules 30A is directly fastened with the holding mount 31A by mounting through the mounting frame 321A.

Figure 10:
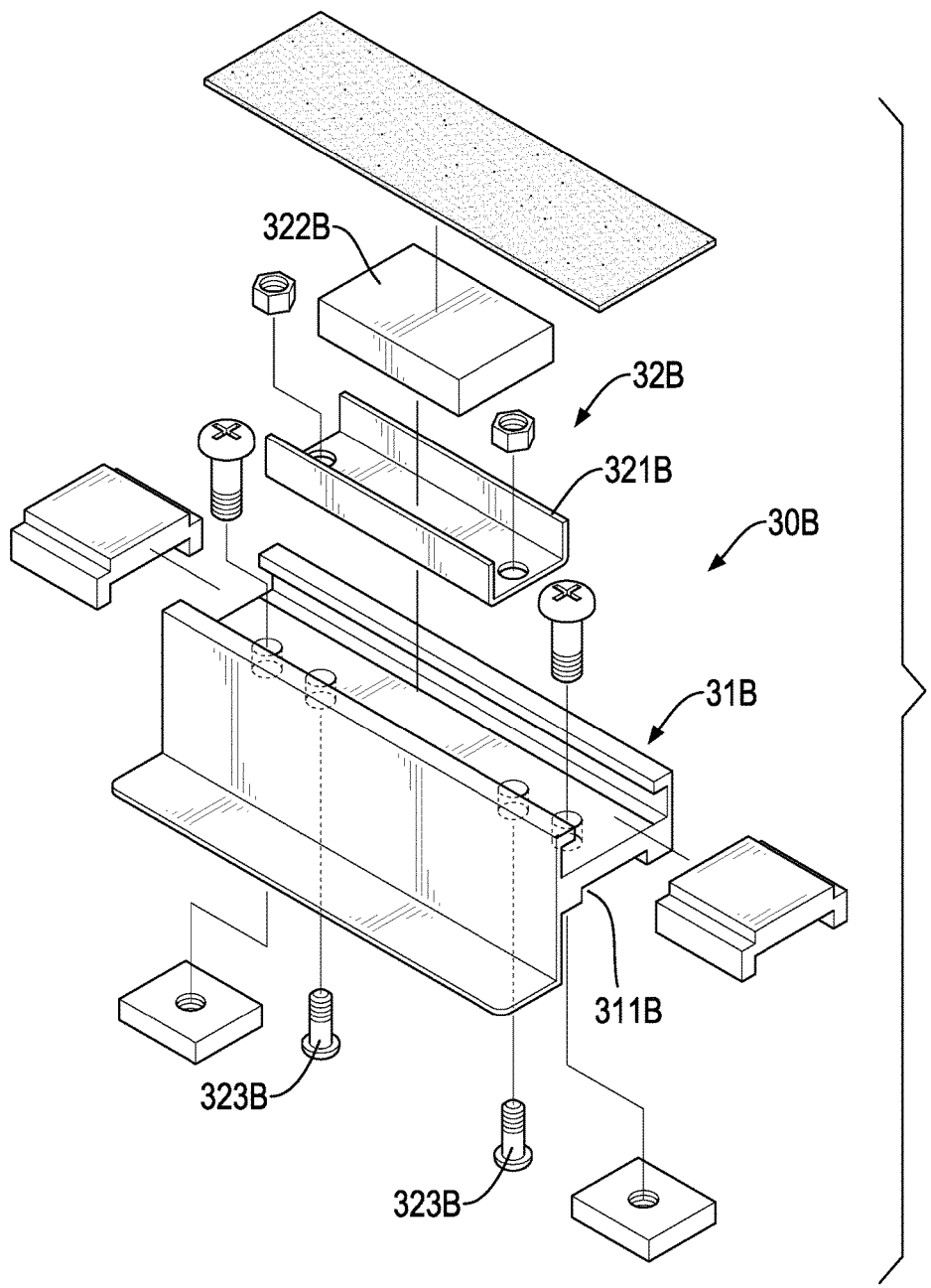
FIG. 10 is enlarged and exploded perspective view of a third embodiment of a magnetic hand tool frame in accordance with the present invention.

With reference to FIG. 10, a third embodiment of a magnetic hand tool frame has similar structures substantially same as the structures in the above-mentioned first embodiment of the magnetic hand tool frame except each magnetic base 32B has a magnetic block 322B and two fasteners 323B, and the magnetic block 322B is mounted on a middle of the mounting frame 321B, and the two fasteners 323B are mounted through the holding mount 31B via the recess 311B and are securely connected to the mounting frame 321B beside the magnetic block 322B.

Figure 11:
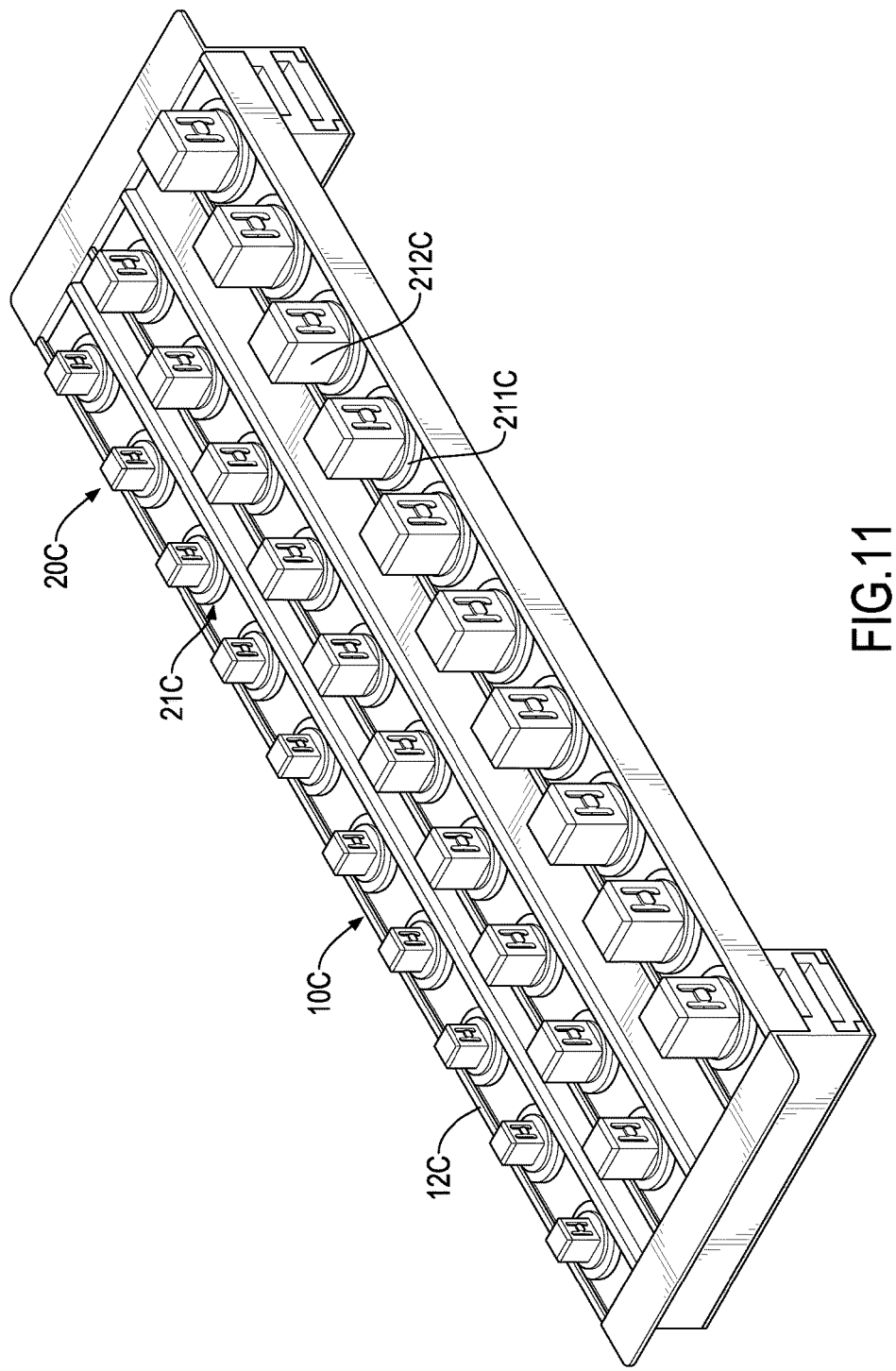
FIG. 11 is a perspective view of a fourth embodiment of a magnetic hand tool frame in accordance with the present invention.

With reference to FIG. 11, a fourth embodiment of a magnetic hand tool frame has similar structures substantially same as the structures in the above-mentioned first embodiment of the magnetic hand tool frame except the at least on clamping element 20C has multiple mounting seats 21C, and the mounting seats 21C are movably mounted in the clamping racks 12C of the baseboard 10C. Each one of the mounting seats 21C has a moving board 211C and a mounting head 212C. The moving board 211C may be round and is movably mounted in one of the clamping racks 12C. The mounting head 212C may be square, is formed on and protrudes from the moving board 211C, and extends out of the corresponding clamping rack 12C. Then, multiple socket bits may be mounted around the mounting heads 212C of the mounting seats 21C to store and display the socket bits on the baseboard 10C.

Figure 12:
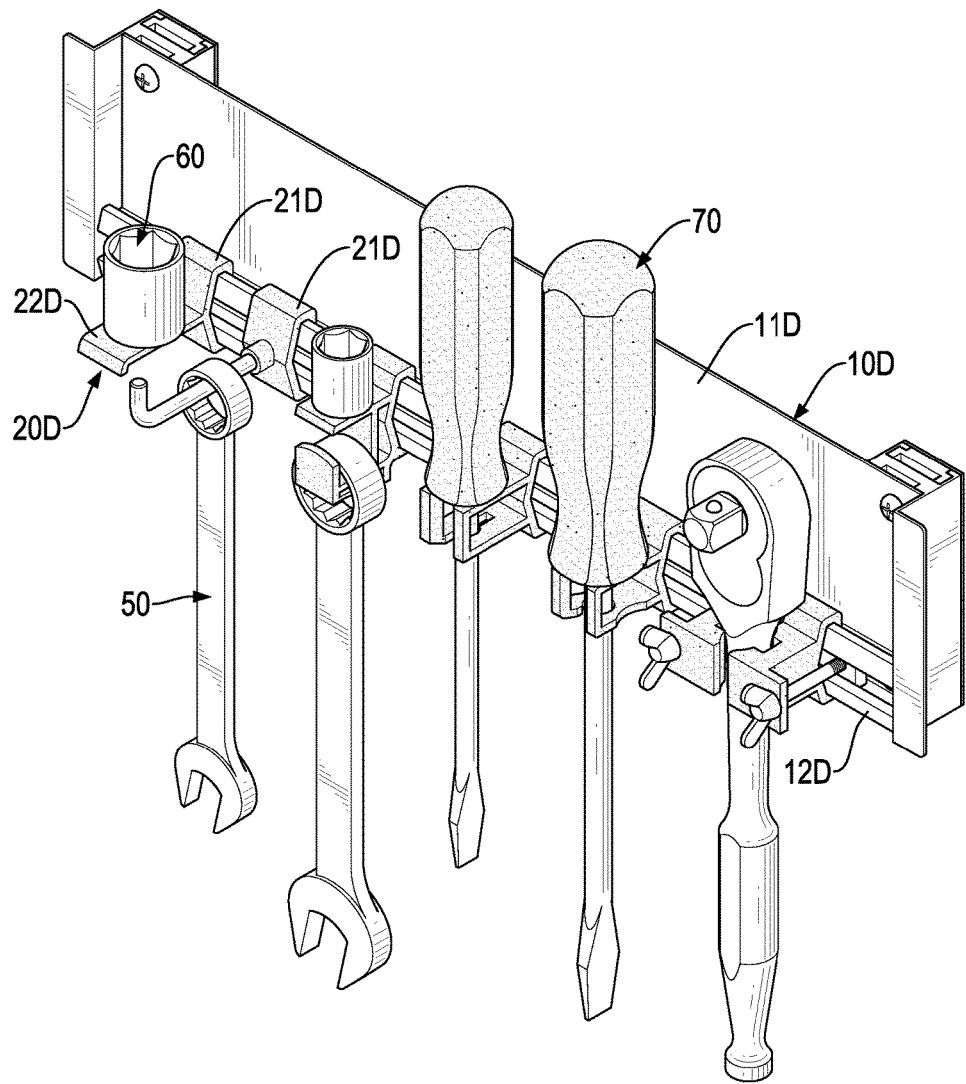
FIG. 12 is a perspective view of a fifth embodiment of a magnetic hand tool frame in accordance with the present invention.

With reference to FIG. 12, a fifth embodiment of a magnetic hand tool frame has similar structures substantially same as the structures in the above-mentioned first embodiment of the magnetic hand tool frame except the baseboard 10D is an elongated sheet, the body 11D has a clamping rack 12D formed on a front side of the body 11D, the at least one clamping element 20D is movably mounted around the clamping rack 12D and has a hooking arm 21D and a hanger base 22D. The hooking arm 21D is movably mounted around the clamping rack 12D. The hanger base 22D is formed on and protrudes forwardly from the hooking arm 21D away from the clamping rack 12D, and has different structures for storing wrenches 50, socket bits 60, or screwdrivers 70. The different structures of the hanger base 22D are conventional and the features and the structures of the hanger base 22D are not described in detail.

Figure 13:
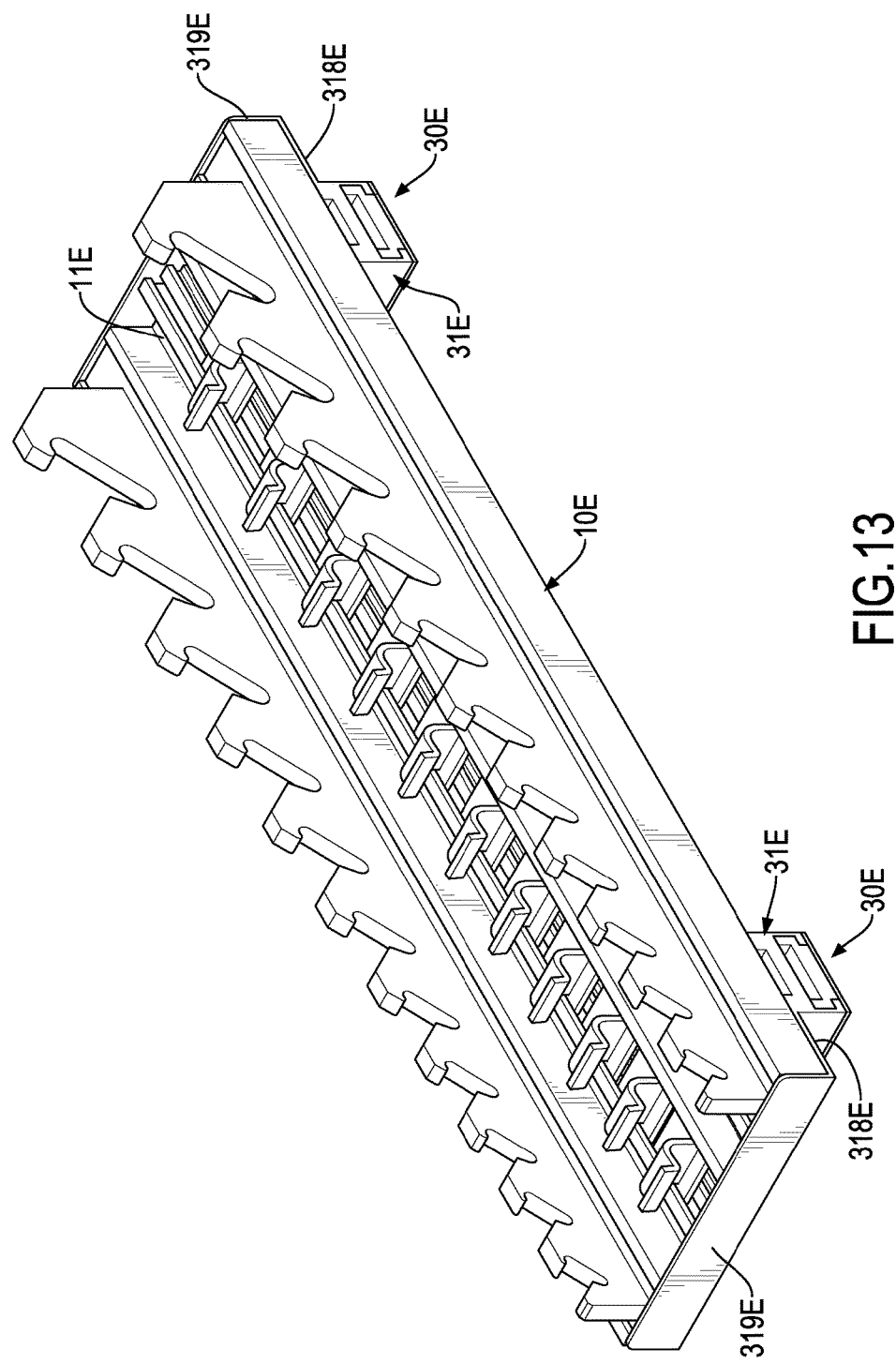
FIG. 13 is a perspective view of a sixth embodiment of a magnetic hand tool frame in accordance with the present invention.
Figure 14:
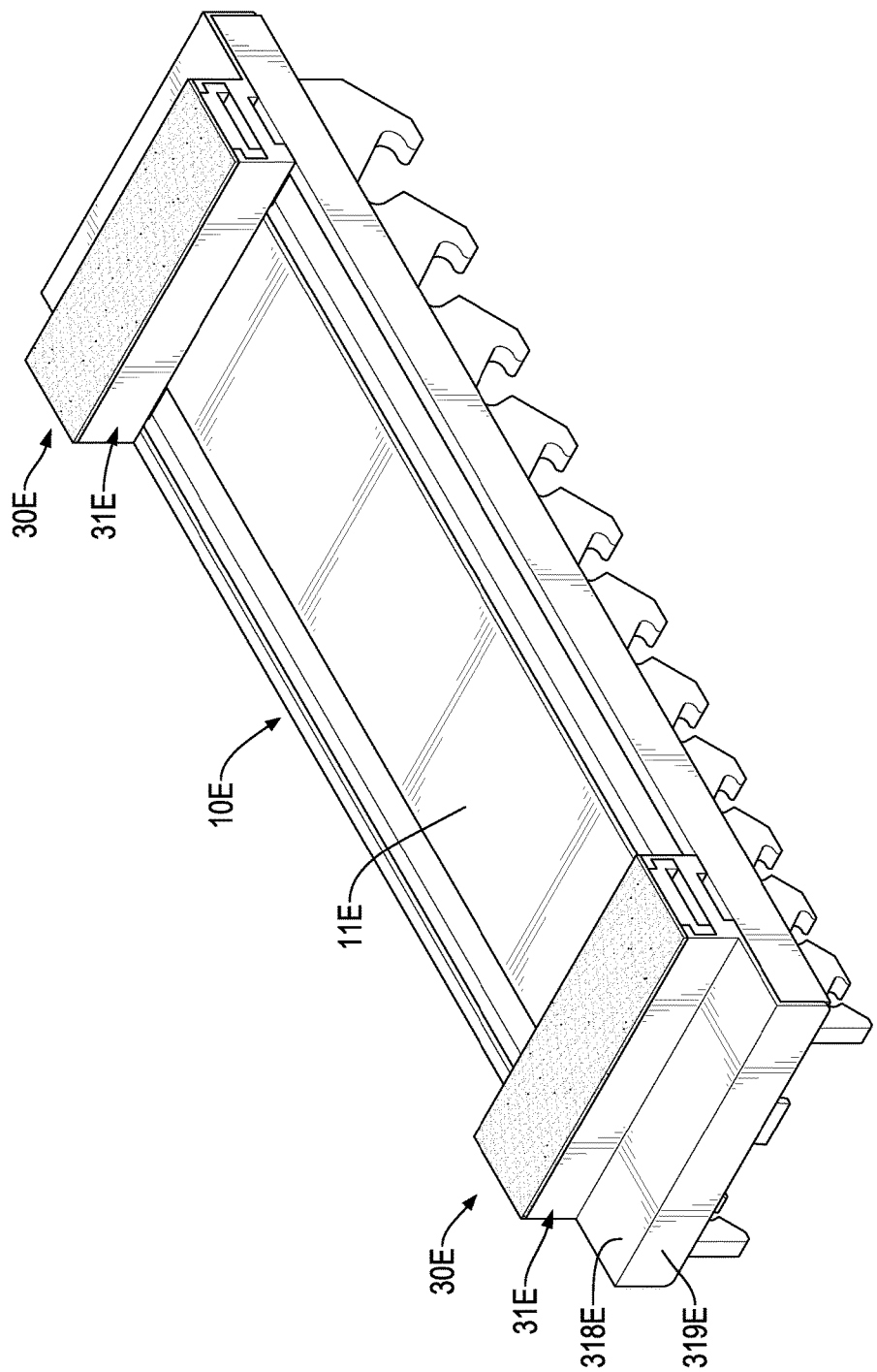
FIG. 14 is another perspective view of the magnetic hand tool frame in FIG. 13.

With reference to FIGS. 13 and 14, a sixth embodiment of a magnetic hand tool frame has similar structures substantially same as the structures in the above-mentioned first embodiment of the magnetic hand tool frame except each one of the attraction modules 30E is connected to the baseboard 10E adjacent to one of the opposite sides of the body 11E to form a spacing between the holding mount 31E and the corresponding opposite side of the body 11E. In addition, the holding mount 31E has an extending panel 318E and a side panel 319E. The extending panel 318E is formed on and protrudes transversally from the outer side of the holding mount 31E close to the corresponding opposite side of the body 11E. The side panel 319E is formed on and protrudes upwardly from the extending panel 318E to close the corresponding opposite side of the body 11E.

Figure 15:
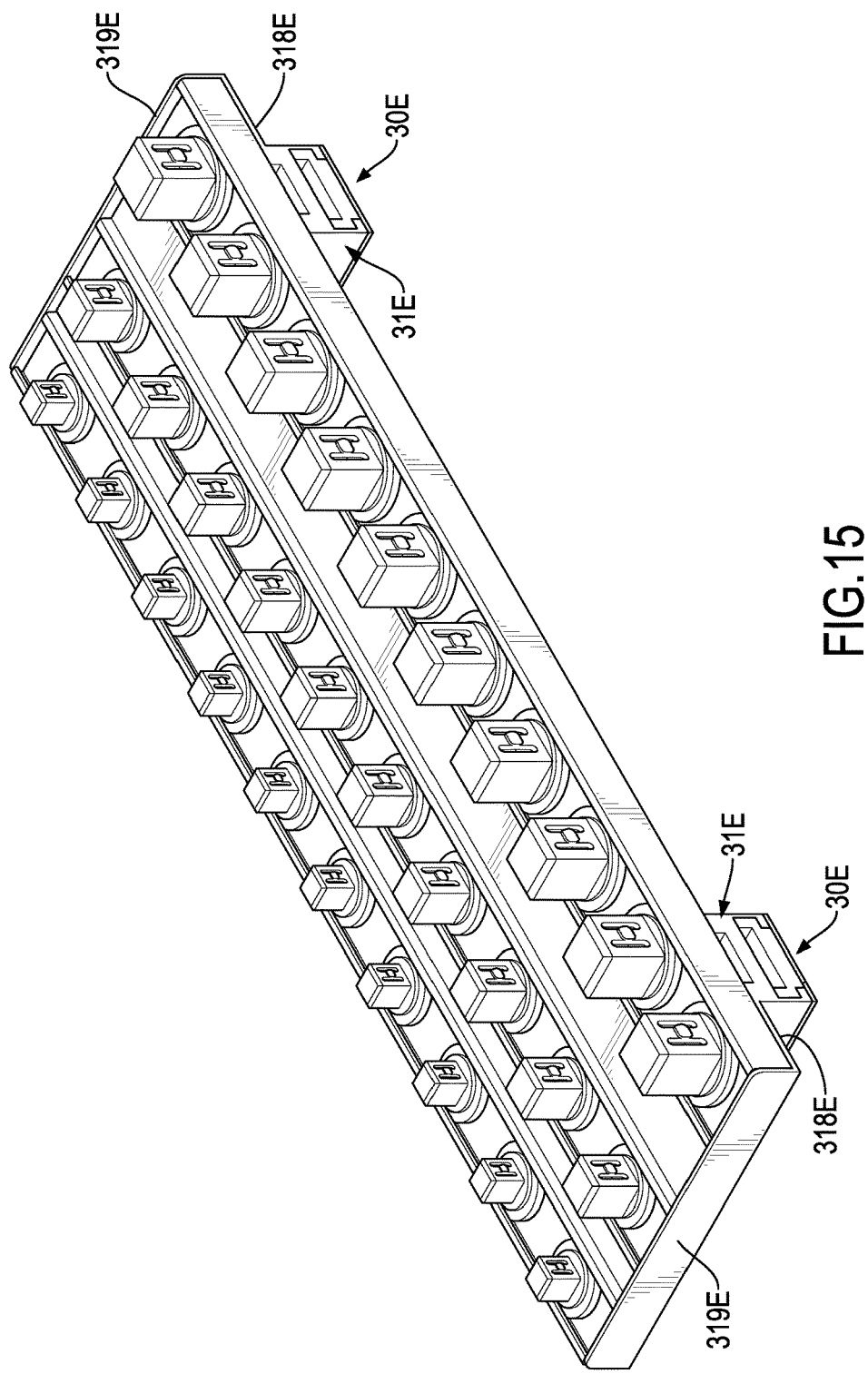
FIG. 15 is a perspective view of a seventh embodiment of a magnetic hand tool frame in accordance with the present invention.

With reference to FIG. 15, a seventh embodiment of a magnetic hand tool frame has similar structures substantially same as the structures in the above-mentioned fourth embodiment of the magnetic hand tool frame except each one of the attraction modules 30E is connected to the baseboard 10E adjacent to one of the opposite sides of the body 11E to form a spacing between the holding mount 31E and the corresponding opposite side of the body 11E. In addition, the holding mount 31E has an extending panel 318E and a side panel 319E. The extending panel 318E is formed on and protrudes transversally from the outer side of the holding mount 31E close to the corresponding opposite side of the body 11E. The side panel 319E is formed on and protrudes upwardly from the extending panel 318E to close the corresponding opposite side of the body 11E.

Figure 16:
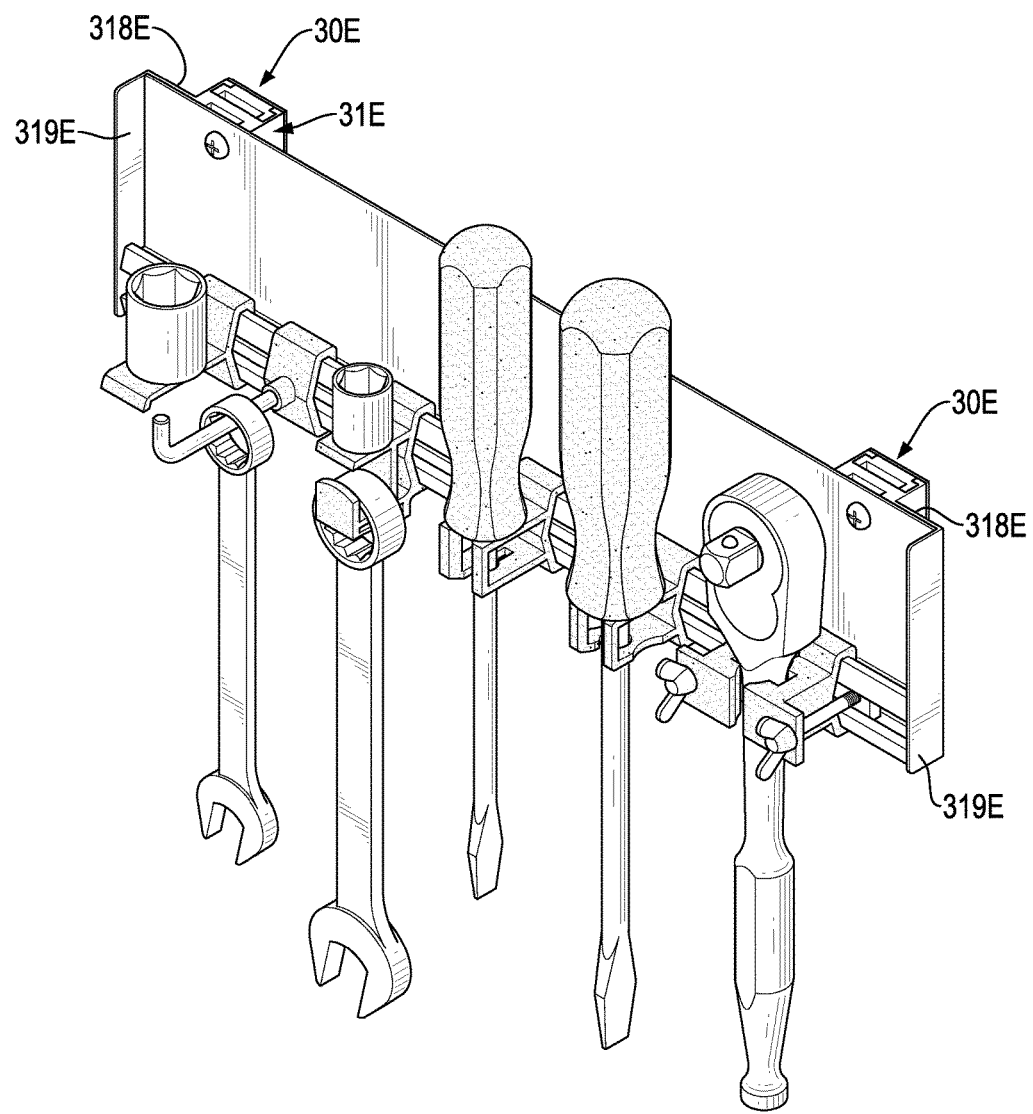
FIG. 16 is a perspective view of an eighth embodiment of a magnetic hand tool frame in accordance with the present invention.

With reference to FIG. 16, an eighth embodiment of a magnetic hand tool frame has similar structures substantially same as the structures in the above-mentioned fifth embodiment of the magnetic hand tool frame except each one of the attraction modules 30E is connected to the baseboard 10E adjacent to one of the opposite sides of the body 11E to form a spacing between the holding mount 31E and the corresponding opposite side of the body 11E. In addition, the holding mount 31E has an extending panel 318E and a side panel 319E. The extending panel 318E is formed on and protrudes transversally from the outer side of the holding mount 31E close to the corresponding opposite side of the body 11E. The side panel 319E is formed on and protrudes upwardly from the extending panel 318E to close the corresponding opposite side of the body 11E.

According to the above-mentioned descriptions, when the magnetic hand tool frame in accordance with the present invention in use, the hand tools such as wrenches 50, socket bits 60 or screwdrivers 70 may be mounted on or clamped by the clamping element 20, 20S, 20D with different structures to store the hand tools on the baseboard 10, 10C, 10D, 10E. Furthermore, the magnetic bases 32 of the attraction modules 30, 30A, 30E may provide a magnetic attraction to the baseboard 10, 10C, 10D, 10E. Then, the magnetic hand tool frame may be securely held on a tool cabinet or a display stand by the magnetic force of the magnetic bases 32 for storing and displaying the hand tools conveniently without using the handle, bolts and nuts.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "having," "has", and "have," are inclusive and therefore specify the presence of stated features, elements, and/or components, but do not preclude the presence or addition of one or more other features, elements, components, and/or groups thereof.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic hand tool frame comprising:
   a baseboard being elongated and including:
      a body having a surface and two opposite sides; and
      at least one clamping rack formed on and protruding from the surface of the body;
   at least one clamping element connected to the at least one clamping rack of the baseboard;
   two attraction modules connected to the baseboard respectively at the opposite sides of the body, each one of the attraction modules including:
      a holding mount connected to the body at one of the opposite sides of the body, being opposite to the at least one clamping element, and having a connecting rack formed on the holding mount and being opposite to the body; and
      a magnetic base connected to the holding mount in the connecting rack, and having:
         a mounting frame securely mounted in the connecting rack of the holding mount; and
         at least one magnetic block securely mounted in the mounting frame to provide a magnetic attraction effect to the magnetic base.

2. The magnetic hand tool frame as claimed in claim 1, wherein the body includes:
   a top surface;
   a bottom surface;
   three clamping racks formed on and protruding from the top surface of the body at spaced intervals; and
   two lower tracks formed on and protruding from the bottom surface of the body and respectively aligning with two of the clamping racks; and
   wherein the holding mount of each one of the attraction modules is connected to the lower tracks at one of the opposite sides of the body of the baseboard.

3. The magnetic hand tool frame as claimed in claim 2, wherein the holding mount of each one of the attraction modules includes:
   a top side abutting the bottom surface of the body and facing the lower tracks at one of the opposite sides of the body;
   a bottom side being opposite to the top side of the holding mount;
   an outer side formed on the holding mount away from the lower tracks;
   a recess formed in the top side of the holding mount and communicating with the lower tracks;
   two through holes formed in the connecting rack, formed through the bottom side and the top side of the holding mount, and respectively communicating with the lower tracks;
   two fixing boards respectively mounted in the lower tracks and respectively aligning with the through holes; and
   two fixing elements respectively mounted through the through holes via the connecting rack, and respectively connected to the fixing boards via the lower tracks to connect the holding mount securely with the baseboard at one of the opposite sides of the body; and
   wherein the connecting rack of each one of the attraction modules is formed on and protrudes from the bottom side of the holding mount.

4. The magnetic hand tool frame as claimed in claim 3, wherein the holding mount of each one of the attraction modules includes:
   a side panel formed on and protruding upwardly from the outer side of the holding mount to close the clamping racks and the lower tracks of the baseboard at one of the opposite sides of the body, and having an outer side opposite to the body; and
   a holding panel formed on and protruding transversally from the outer side of the side panel.

5. The magnetic hand tool frame as claimed in claim 3, wherein the holding mount of each one of the attraction modules is connected to the baseboard adjacent to one of the opposite sides of the body to form a spacing between the holding mount and the corresponding opposite side of the body, and the holding mount includes:
   an extending panel formed on and protruding transversally from the outer side of the holding mount close to the corresponding opposite side of the body; and
   a side panel formed on and protruding upwardly from the extending panel to close the corresponding opposite side of the body.

6. The magnetic hand tool frame as claimed in claim 4, wherein the magnetic base of each one of the attraction modules includes at least one fastener mounted through the holding mount from the recess to the mounting frame, and securely connected to the mounting frame to hold the magnetic base securely with the holding mount.

7. The magnetic hand tool frame as claimed in claim 5, wherein the magnetic base of each one of the attraction modules includes at least one fastener mounted through the holding mount from the recess to the mounting frame, and securely connected to the mounting frame to hold the magnetic base securely with the holding mount.

8. The magnetic hand tool frame as claimed in claim 4, wherein the magnetic base of each one of the attraction modules includes at least one fastener directly fastened with the holding mount by mounting through the mounting frame.

9. The magnetic hand tool frame as claimed in claim 5, wherein the magnetic base of each one of the attraction modules includes at least one fastener directly fastened with the holding mount by mounting through the mounting frame.

10. The magnetic hand tool frame as claimed in claim 6, wherein the magnetic base of each one of the attraction modules includes:
   a magnetic block mounted on a middle of the mounting frame of the magnetic base; and
   two fasteners mounted through the holding mount via the recess and securely connected to the mounting frame beside the magnetic block.

11. The magnetic hand tool frame as claimed in claim 7, wherein the magnetic base of each one of the attraction modules includes:
   a magnetic block mounted on a middle of the mounting frame of the magnetic base; and
   two fasteners mounted through the holding mount via the recess and securely connected to the mounting frame beside the magnetic block.

12. The magnetic hand tool frame as claimed in claim 6, wherein the magnetic base of each one of the attraction modules includes two magnetic blocks mounted in the mounting frame at a spaced interval.

13. The magnetic hand tool frame as claimed in claim 7, wherein the magnetic base of each one of the attraction modules includes two magnetic blocks mounted in the mounting frame at a spaced interval.

14. The magnetic hand tool frame as claimed in claim 1, wherein:
   the mounting frame of the magnetic base of each one of the attraction modules has a length shorter than a length of the connecting rack of the holding mount of the attraction module; and
   each one of the attraction modules includes two limiting mounts mounted in the connecting rack and mounted beside the mounting frame, and each one of the limiting mounts having:
      a middle segment extending out of the connecting rack;
      a bottom segment formed with the middle segment of the limiting mount and mounted in the connecting rack; and
      a through slot transversally formed through the bottom segment of the limiting mount and communicating with the connecting rack; and
      a decorative plate securely mounted on the connecting rack of the holding mount to cover the magnetic base and the limiting mounts.

* * * * *